United States Patent
Collins et al.

(10) Patent No.: US 8,582,470 B2
(45) Date of Patent: Nov. 12, 2013

(54) ARRANGEMENT AND METHOD RELATING TO NETWORK MANAGEMENT

(75) Inventors: Sandra Collins, Dublin (IE); Samir Ghamri-Doudane, Paris (FR); Francoise Sailhan, Paris (FR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 556 days.

(21) Appl. No.: 12/530,635

(22) PCT Filed: Mar. 12, 2007

(86) PCT No.: PCT/EP2007/052277
§ 371 (c)(1),
(2), (4) Date: Feb. 11, 2011

(87) PCT Pub. No.: WO2008/110202
PCT Pub. Date: Sep. 18, 2008

(65) Prior Publication Data
US 2011/0188378 A1    Aug. 4, 2011

(51) Int. Cl.
*H04L 12/28* (2006.01)
*H04W 4/00* (2009.01)
*H04L 12/24* (2006.01)
*H04W 84/02* (2009.01)

(52) U.S. Cl.
CPC .............. *H04L 41/12* (2013.01); *H04L 41/145* (2013.01); *H04W 84/02* (2013.01)
USPC ............ 370/254; 370/338; 370/401; 709/249

(58) Field of Classification Search
USPC ........... 370/254, 328, 338, 401, 408; 709/249
See application file for complete search history.

(56) References Cited

U.S. PATENT DOCUMENTS

| | | | |
|---|---|---|---|
| 6,105,061 A | | 8/2000 | Nakai |
| 2006/0173857 A1* | | 8/2006 | Jackson .......................... 707/10 |
| 2006/0200862 A1 | | 9/2006 | Olson |
| 2007/0054670 A1* | | 3/2007 | Kalika et al. ................... 455/446 |
| 2007/0147271 A1* | | 6/2007 | Nandy et al. ................... 370/254 |
| 2007/0280165 A1* | | 12/2007 | Doshi et al. .................... 370/331 |

OTHER PUBLICATIONS

Stallings, W., "SNMP, SNMP v2, and CMIP the Practical Guide to Network Management Standards", Addison Wesley, 1993.
Chen, W. et al. "ANMP: Ad Hoc network management protocol", IEEE Journal on Selected Areas in Communications, vol. 17, No. 8, Aug. 1999.

(Continued)

*Primary Examiner* — Paul H Masur
(74) *Attorney, Agent, or Firm* — Potomac Patent Group PLLC

(57) ABSTRACT

A traffic network having a wired as well as a wireless network backbone is managed. The wireless network backbone has relay nodes having wireless routers, some acting as gateways to the wired backbone network and some as relay bridge routers for access network access. A management system has a logical multilevel hierarchical network overlying the traffic network. It is adapted to use the relay nodes as management stations. It performs a grouping process by arranging network nodes, including the relay nodes, in groups, each with a cluster head, on different hierarchical levels. A grouping controller controls the grouping and allocation of cluster heads based on a number of grouping constraints given by one or more criteria to be fulfilled at each hierarchical level. The criteria are calculated based on given metrics, the constraints are modeled, and fulfillment of the constraints is verified at each hierarchical level.

25 Claims, 7 Drawing Sheets

(56) References Cited

OTHER PUBLICATIONS

Sivavakeesar, S. et al. "Stable Clustering through Mobility Prediction for Large-Scale Multihop Intelligent Ad Hoc Networks", Proceedings of the IEEE Wireless Communications and Networking Conference (WCNC 2004), Atlanta, USA, Mar. 2004.

Jacquet, P. et al. "Optimized Link State Routing Protocol", RFC 3626, Oct. 2003.

PCT International Search Report, mailed Jul. 31, 2007, in connection with International Application No. PCT/EP2007/052277.

Siegl M R et al: "Hierarchical network management: a concept and its prototype in SNMPv2", Computer Networks and ISDN Systems, NL, vol. 28, No. 4, Feb. 1996, pp. 441-452, XP004002977 ISSN: 0169-7552.

* cited by examiner

ARRANGEMENT AND METHOD RELATING TO NETWORK MANAGEMENT

BACKGROUND

The present invention relates to a network management system for management of a traffic network comprising a wired network backbone and a wireless network backbone which comprises a plurality of relay nodes comprising wireless routers. Some of the relay nodes act as gateways to the wired network backbone and some act as relay bridge routers supporting access of a number of access networks. The management system comprises a number of management stations arranged in a distributed manner and adapted to handle subnetworks of said traffic network. The invention also relates to a method for managing a traffic network as referred above.

STATE OF THE ART

Today there exists three main approaches of network management. Which category of network management that is implemented basically depends on the architecture of the traffic network to be managed and its communication scheme. The first category of network management is a centralized approach wherein one management station, a central manager, controls the entire network and all the network nodes are under the authority thereof. This approach is mostly used for management of current IP-based wired networks, in conjunction with specific protocols such as SNMP (Simple Network Management Protocol), see for example W. Stallings, "SNMP, SNMP v2, and CMIP the Practical Guide to Network management Standards", Addison Wesley 1993.

The second category of network management is a distributed approach wherein several management stations are provided within the network, each of them managing a subnet, also called network partitioning. The management stations communicate and coordinate themselves in a peer-to-peer fashion. The third category of network management is based on a hierarchical approach wherein intermediate managers are introduced in the network. The management system is organized in a multi-level hierarchy of management stations. The communication between managers is vertical and there is no horizontal management communication, for example between intermediate managers on the same level. The managed network nodes form the lower layers of this hierarchy. Such approaches are mainly used for the management of for example WCDMA (Wireless Code Division Multiple Access) access networks.

So called Ad Hoc networks can be seen as mobile client mesh networks, where a set of mobile end users form a spontaneous network. Ad Hoc networks have a highly dynamic topology and limited energy resources. Therefore there are requirements on the management system to limit the bandwidth usage and to provide for scalability. Currently several management architectures are used for Ad Hoc networks. Mainly they are based on a combination of distributed and hierarchical approaches. Centralized management approaches are not convenient because of the scalability limitations which are inadequate for Ad Hoc environments. Examples on Ad Hoc network management can be seen in Wenli Chen, Nitin Jain, Suresh Singh, "ANMP: Ad Hoc network management protocol", IEEE Journal on selected areas in communications, vol 17, no 8, August 1999 and S. Sivavakeesar, P. Pavlou, and A. Liotta, "Stable Clustering Through Mobility Prediction for Large-Scale Multihop Intelligent Ad Hoc Networks", Proceedings of the IEEE Wireless Communications and Networking Conference (WCNC 2004), Atlanta, USA, March 2004.

Another type of network is client wireless mesh networks, where end user devices participate in forwarding of packets. Such networks provide peer-to-peer communication over client devices. This means that the user devices should perform additional functionality such as routing and configuration. As a consequence thereof the operation of a client wireless mesh network is not managed by an operator, or service provider.

It can be seen that different types of traffic networks need to be managed in different ways.

A particular network structure is constituted by traffic networks comprising a wired network backbone and a wireless network backbone, which is composed exclusively of multi-radio relay nodes, or wireless routers. The client devices do not participate in packet forwarding, and if connected to the Internet, a mesh router also implicitly provides a gateway functionality. Inside the backbone various radio technologies can be used, for example IEEE 802.11, 802.16 etc. An example of such networks are infrastructure wireless mesh networks. They provide connectivity to various access networks of different types, for example WiFi, 3G access network, Sensor networks, wired clients etc. through specific bridges. It is however a problem that, so far, no satisfactory solution has been found which is convenient for management of such a mixed system, i.e. a traffic system comprising a wired network backbone and a wireless network backbone, particularly a WMN. Management systems based on a centralized approach are not suitable for traffic networks of this type, especially not if they are implemented in large scale. The centralized approach would result in a high message overhead and consequently introduce a large waste of bandwidth, which is a critical resource in wireless environments. The central manager further would implement polling or asynchronous notifications. Both these approaches however result in the central manager becoming a single point of failure, as well as a bottleneck, in the network.

The other management systems discussed above (hierarchical or distributed) are designed for Ad Hoc networks, which is another type of network. Therefore they deal with the characteristics of such networks, namely high mobility, limited energy resources (battery power), very dynamic topologies and high disparity between node capabilities. According to the reference by Wenli Chen, et al. referred to above, the main data carried by the ANMP protocol describe node positions, battery power level etc. Thus, although the networks comprising a wired network backbone and a wireless network backbone (for example infrastructure WMNs share some requirements with Ad Hoc networks as far as management is concerned, namely those of limiting the usage of bandwidth and capability of scalability), the management systems used for Ad Hoc networks are not appropriate for management of networks with a wired and a wireless network backbone among other things since such management systems concentrate on the particular features of Ad Hoc networks.

Thus, so far no satisfactory solution has been found as far as management of traffic networks having a wired network backbone and a wireless network backbone are concerned.

SUMMARY

It is therefore an object of the present invention to provide a network management system for traffic networks of the type referred to above, i.e. traffic networks comprising both a wired and a wireless network backbone, which is reliable and robust. It is also an object to provide a network management system which provides for efficient management and which is able to minimize the management traffic, particularly in the wireless part of the network. It is also an object of the invention to suggest a network management system which is capable of reducing the bandwidth usage in the wireless backbone. Still further it is an object of the present invention to provide a management system which provides for good scalability and which is appropriate for large-scale wireless mesh networks. Still further it is an object of the invention to provide a management system which reduces or minimizes the risk of bottlenecks and single points of failure. Moreover it is an object of the invention to suggest a management system which removes the need for high capacity central managers.

It is also an object of the present invention to provide a method for network management of traffic networks as referred to above through which one or more of the above mentioned objects can be achieved.

Therefore, a network management system as referred to above is provided which comprises a logical multi-level hierarchical overlay network with a top level or central manager. It is adapted to use the infrastructure of the traffic network by using the relay nodes as management stations. It comprises grouping means adapted to perform a grouping process by arranging network nodes, comprising the relay nodes, in groups or clusters, each with a cluster head, on different hierarchical levels, wherein said grouping means comprise grouping control means adapted to control the grouping and allocation of cluster heads. Said grouping control means are adapted to control the grouping process based on a number of grouping constraints given by one or more criteria to be fulfilled at each hierarchical level, and comprises calculating means adapted to calculate criteria based on given metrics and modelling and verification means for modelling the constraints and verifying fulfilment of said constraints at each hierarchical level.

In order to fulfil one or more of the above mentioned objects a method is also provided for managing a traffic network comprising a wired network backbone and a wireless network backbone comprising a plurality of relay nodes which comprise wireless routers of which some acts as gateways to the wired backbone network and of which some comprise relay bridge routers for access purposes. The method comprises arranging a number of management stations in a distributed manner to handle sub-networks of said traffic network and arranging the management system as a logical, hierarchical network over said traffic network. This arranging comprises; using the infrastructure of the traffic network by using the relay nodes as management stations; providing a central manager, and performing, on different hierarchical levels, a grouping process by arranging network nodes, relay nodes, in groups or clusters and, for each group, allocating a cluster head, while, for said grouping process; defining a number of metrics to calculate criterias to be fulfilled at each hierarchical level; modelling a number of constraints based on said criteria; verifying fulfilment of said constraints at each hierarchical level.

It is an advantage of the present invention that efficient network management can be provided which is particularly adapted for the type of networks comprising a wired network backbone and wireless network backbone, which management further is reliable and which can minimize the overall bandwidth usage in the wireless mesh backbone. It is also an advantage that a network management system is provided which improves scalability and which is suitable for large or very large scale wireless mesh networks. It is also an advantage of the invention that a management system is provided which, instead of becoming more complicated due to the specific structure of the network, is able to take advantage of the inherent traffic network structure and which is particularly dedicated for this type of network. It is also an advantage of the invention that the risk of producing bottlenecks and single points of failure is reduced and that there is no need for a very high capacity central manager and that it in addition thereto allows for an efficient usage of resources.

It is also an advantage of the invention that a flexible and adaptable network management system is provided. Another advantage is that it facilitates the procedure at topology updates, insertion of nodes or removal of nodes, fault detection and recovery network reorganization and regrouping etc.

BRIEF DESCRIPTION OF THE DRAWINGS

The invention will in the following be further described, in a non-limiting manner, and with reference to the accompanying drawings, in which.

DETAILED DESCRIPTION

Figure 1:
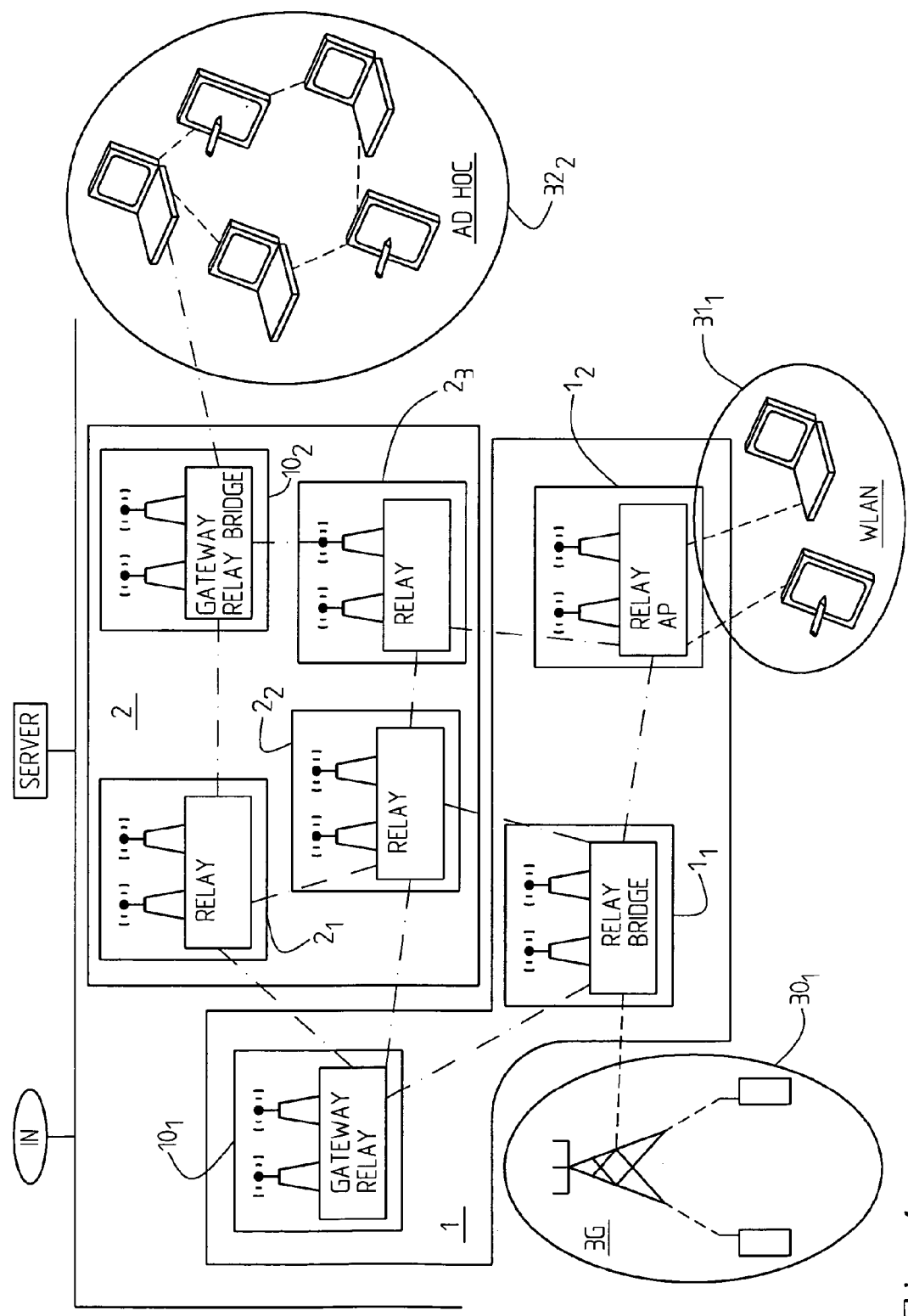
FIG. 1 very schematically illustrates an infrastructure wireless mesh network wherein the inventive concept is implemented, FIG. 2 very schematically illustrates a management architecture according to the present invention with three hierarchical levels.

According to the present invention the grouping means are adapted to perform a grouping or clustering procedure through which effective management of networks for example comprising infrastructure wireless mesh networks (WMN) is provided. The grouping procedure or clustering mechanism comprises formation of a multi-level hierarchical logical overlay management network. Particularly the grouping procedure or clustering mechanism is optimized to manage such networks and their critical characteristics, among others scalability and bandwidth saving. The optimization is, according to the invention, achieved through the application of metrics capturing the characteristics of the traffic network. The grouping procedure comprises an n-level hierarchical clustering including identification of the relevant metrics, constraints and grouping mechanism and strategies that should be used to form the logical overlay management clustering which is optimized particularly for the purposes of managing large-scale WMNs.

According to the invention the grouping means can be implemented in different manners. In a first implementation they are provided in the central manager. The grouping control means can be external and adapted to statically group the nodes and statically select cluster heads (and intermediate cluster heads on different levels). Particularly such external control means may comprise administrating means or comprise a network administrator.

In an alternative embodiment the grouping means comprise computing means running an algorithm incorporating the constraints as referred to earlier in the application and the central manager is adapted to collect data from the network needed to perform the grouping procedure.

In still another embodiment the grouping means are distributed and comprise a distributed grouping algorithm containing said constraints and each network node is adapted to contain the same distributed algorithm, i.e. each node also being adapted to perform the grouping control function as well as the actual grouping.

It should be clear that the grouping means and the grouping control means can be seen as separate, distinct means or as one and the same means according to different embodiments. It can also be seen as a division into two different means, one effectuating the decision made by the actual control means or as one and the same means carrying out both the grouping control process and the grouping functionality itself.

Most particularly the underlying traffic network is an infrastructure wireless mesh network (WMN).

Irrespectively of how the grouping means (and/or grouping control means) are implemented, a number of grouping constraints are identified and implemented. In the following some examples of grouping constraints will be given and the management system may implement one, more or all thereof, as well as alternative or additional constraints. The constraints are here denoted first, second etc. for reasons of clarity, without the numbering implicating anything about the importance of the constraint.

In a particular embodiment a first constraint is adapted to control the distribution of gateways in the groups considering the number of gateways and the number of groups in the radio network such that a substantially even distribution of gateways can be obtained throughout the network or among the groups. A second constraint is adapted to control, or to be used to control, the grouping such that within each group, each group member can be reached by the respective cluster head (or intermediate cluster head) through a local path. A local path is here defined as containing only nodes within the same group. According to a third constraint it is intended to control the allocation of cluster heads such that in each group containing one gateway node, said gateway node is to be selected as cluster head.

A fourth constraint is given to control the allocation of a cluster head in a group containing more than one gateway node such that the gateway node with the highest connectivity degree is selected as a cluster head. According to a fifth constraint it is intended to control the selection of a cluster head in a group with no gateway node such that the node closest to the fault gateway will be selected.

Particularly the modelling and verification means are adapted to model at least one or more of said constraints based on one or more parameters relating to the number of clusters in the network (C), nodes constituting particular group i ($C_i$), set of gateway nodes of group i ($G_i$), set of all gateways in the network (G), cardinality (size) of set i ($X_i$), cluster head of group i ($h_i$), set of nodes constituting default path from a node n to a node m ($P_{n,m}$), connectivity degree of node n (Con(n)), distance between a node n and its default gateway (Dist(n)).

In a particular embodiment at least one of a first and a second criterion are used for the constraint modelling, said criteria being defined by the metric physical distance and the metric temporal distance respectively. The metric physical distance comprises the hop count between two nodes and the temporal distance comprises the transmission time in expected round trip time between two nodes. In a particular embodiment the first criterion is the nearest physical distance or nearest temporal distance between two nodes and the second criterion is the connectivity of a node comprising the number of nodes a given number of hops away from said node, with the number of nodes a given time away from the node expressed in round trip time.

The grouping means may be adapted to optimize the number of groups in relation to network size, and the number of nodes in the respective group, with respect to network size and/or number of groups with regard to bandwidth consumption and message transmission overhead required for management purposes.

Preferably each node comprises message generating means, message reception means and one or more timers. The message generating means may be adapted to generate messages and to send said messages to node neighbours when a node is added to the network. The message means may also be adapted to send messages to establish and verify selection of a cluster head. The message generating means preferably also starts the/a timer and awaits reception of response messages before the timer lapses to establish a cluster head, and in the absence of a response, defines a new node or itself as a cluster head. According to different embodiments a number of steps corresponding to different alternative embodiments may also be provided.

FIG. 1 shows an example of a traffic network (an infrastructure WMN) on which a network management system according to the present invention is provided. The network backbone comprises multi-radio relay nodes, wireless routers $10_1$, $1_1$, $1_2$, $2_1$, $2_2$, $2_3$, $10_2$ which according to the inventive concept will act as management stations. When connected to the Internet a mesh router $10_1$, $10_2$ implicitly provides a gateway functionality. Inside the backbone various radio technologies can be used, e.g. IEEE 802.11, IEEE 802.16 etc. Here the network provides connectivity to various access networks by means of the wireless routers comprising relay access point $1_2$ providing access to WLAN $31_1$, relays bridge $1_1$ to 3G access network $30_1$, and gateway relay bridge $10_2$ to an Ad Hoc network $32_2$. The gateway relay node $10_1$ has been selected as cluster head for group 1 and gateway relay bridge $10_2$ has been selected as cluster head for group or cluster 2. It should be clear that this merely is a very schematical illustration.

Figure 2:
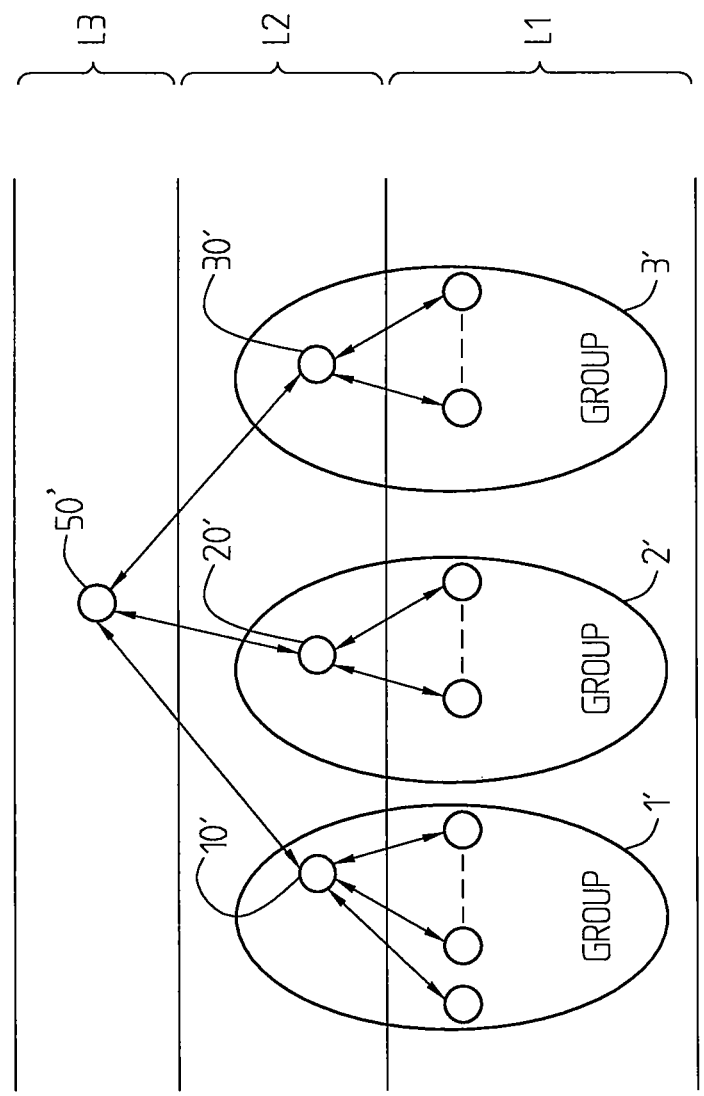

FIG. 2 schematically illustrates a 3-level hierarchical management architecture wherein level 1 L1 comprises simple managed nodes, level 2 L2 comprises intermediate managers or cluster heads 10', 20', 30' and level 3 L3 comprises a central manager 50'. The present invention generally provides an n-level hierarchical architecture. The schematically illustrated 3-level implementation can easily be extended to the general case of a multi-level hierarchy. The 3-level hierarchy of the management system of FIG. 2 is a strictly logical view and the arrows in the figure do not represent direct physical links but logical ascendance in the management hierarchy. The clustering or grouping is used to form a logical overlay management network which is not directly mapped onto the underlying traffic network. The main thing when applying the clustering is to build groups and to elect cluster heads in an optimal way for the management of the underlying traffic network, particularly a WMN.

Throughout the application, cluster heads also denote intermediate cluster heads of different levels, e.g. for four Or n-level structures. Here the first level L1 comprises simple managed nodes that are arranged in three groups 1', 2', 3'. The second level L2 comprises cluster heads 10', 20', 30' managed by a central manager 50' in layer L3. A basic aspect of the present invention is to provide the constraints and the relevant metrics that should be addressed during the grouping procedure in order to optimize the overall management system. The constraints and the metrics are actually given by the principal characteristics of the underlying traffic network. According to the present invention the main characteristics of a traffic network as discussed have been identified as the existence of a number of gateways connecting the wireless backbone to the wired backbone whereby the central manager normally is situated in the wired backbone. This means that the significant part of the management traffic goes through these gateways. In addition thereto the bandwidth in the wireless backbone is restricted compared to the bandwidth in the wired backbone which means that the management system should minimize the usage of the wireless bandwidth. Moreover, the traffic networks may be large-scale networks with a large number of nodes. As an example they may contain more than 1000 nodes, although the invention of course is not limited to management of such traffic networks. In that case, however the management system must be scalable to be able to efficiently manage a very large number of nodes. Based on the characteristics referred to above, the grouping means or the clustering mechanism preferably should adhere to one or more of a number of constraints in order to optimize management of the traffic network. According to one constraint the number of gateways contained in each group should be fairly distributed. If for example the backbone contains 5 gateways and is divided into 7 groups, then each group will contain at most one gateway.

Another constraint that should be fulfilled is that the members of one and the same group should form a coherent island inside the network. This means that the cluster head must be able to reach each member of its group over a local path, here defined as a path containing only nodes within the same group. Preferably all the nodes within a group should be one hop away from the cluster head. Another constraint that should be fulfilled is that if a group contains one gateway, then this gateway should be elected as a cluster head whereas according to another constraint, if a group contains several gateways, the one with the most or highest connectivity should to be elected as a cluster head. According to another constraint the node which is "nearest" to its default gateway should be chosen as a cluster head if there is no gateway in a group. Also, connectivity is the criterion to decide in case of similarities. According to the invention, these or at least some thereof, or even further constraints should be fulfilled by the grouping process at every level.

The modelling and (verification means) provide for a mathematical modelling of the constraints. For that purpose a number of parameters are defined, in a particular example the number of clusters in the entire network (C), the set of all nodes constituting the i:th group (or cluster) ($C_i$), the set of all gateway nodes contained by group i ($G_i$), the set of all gateways in the entire network (G), the cardinality (size) of set X ($\overline{X}$), the cluster head of group i ($h_i$), the set of all nodes constituting the default path from node n to node m ($P_{n;m}$), the connectivity degree of node n (Con(n)) and the distance between node n and its default gateway (Dist(n)). Mathematically seen, the grouping result must verify the constraints referred to above as follows:

Constraint No. 1
$$(\forall i \in \{1 \ldots c\}) \frac{\overline{G}}{c} - 1 \langle \overline{G_i} \langle \frac{\overline{G}}{c} + 1$$

Constraint No. 2
$$(\forall i \in \{1 \ldots c\})(\forall n \in C_i)(\forall m \in P_{n,hi}) m \in C_i$$

Constraints No. 3 and 4
$$(\forall i \in \{1 \ldots c\}) \overline{G_i} = 0 \Rightarrow (\forall n \in C_i)(Dist(h_i) \leq Dist(n)) \wedge$$
$$((Dist(n) = Dist(h_i)) \Rightarrow (Con(n) \leq Con(h_i)))$$

Constraint No. 5
$$(\forall i \in \{1 \ldots c\}) \overline{G_i} = 0 \Rightarrow (\forall n \in C_i)(Dist(h_i) \leq Dist(n)) \wedge$$
$$((Dist(n) = Dist(h_i)) \Rightarrow (Con(n) \leq Con(h_i)))$$

For modelling these constraints, it is relied on the presence of here two criteria, nearest (or distance) and connectivity. In order to compute the criteria by means of computing means, a number of relevant metrics are defined. Other metrics can be used but in an advantageous embodiment the metrics physical distance (hop count) and temporal distance (transmission time) can be used. They can be used separately or in combination.

For the metric physical distance the criterion nearest means with minimum hop count, distance is the hop count between two nodes and connectivity is the number of nodes that are n-hop away. In general it is one or two-hop away. This metric can be used to minimize the message overhead.

For the metric temporal distance, the criterion nearest means with minimum expected RTT (round trip time), distance is a temporal distance and means the expected RTT between two nodes and the connectivity criterium is the number of nodes that are t-time away, for example 100 ms away. This metric is suitable for time sensitive systems. It should be clear that the figure 100 ms merely is given for exemplifying reasons.

The grouping procedure or clustering process is an application level mechanism. It therefore assumes the existence of a complete connectivity at the routing layer. The connectivity at routing layer can provide all the necessary information to compute the metrics. One example of an efficient routing protocol for multi-hop wireless networks is OLSR as for example described in T. Clausen, P. Jacquet, et al., "Optimized link state routing protocol", RFC 3626, October 2003.

The number of nodes in a group, as well as the overall number of groups, depends on the network size. If the groups are too large, the monitoring of the group members by a cluster head will lead to a high message overhead and bandwidth consumption. If the groups on the other hand are too small, the network will contain a large number of cluster heads, and then the monitoring of the cluster heads by the central manager will lead to a high bandwidth consumption. The grouping or clustering process should find the best compromise.

Figure 3:
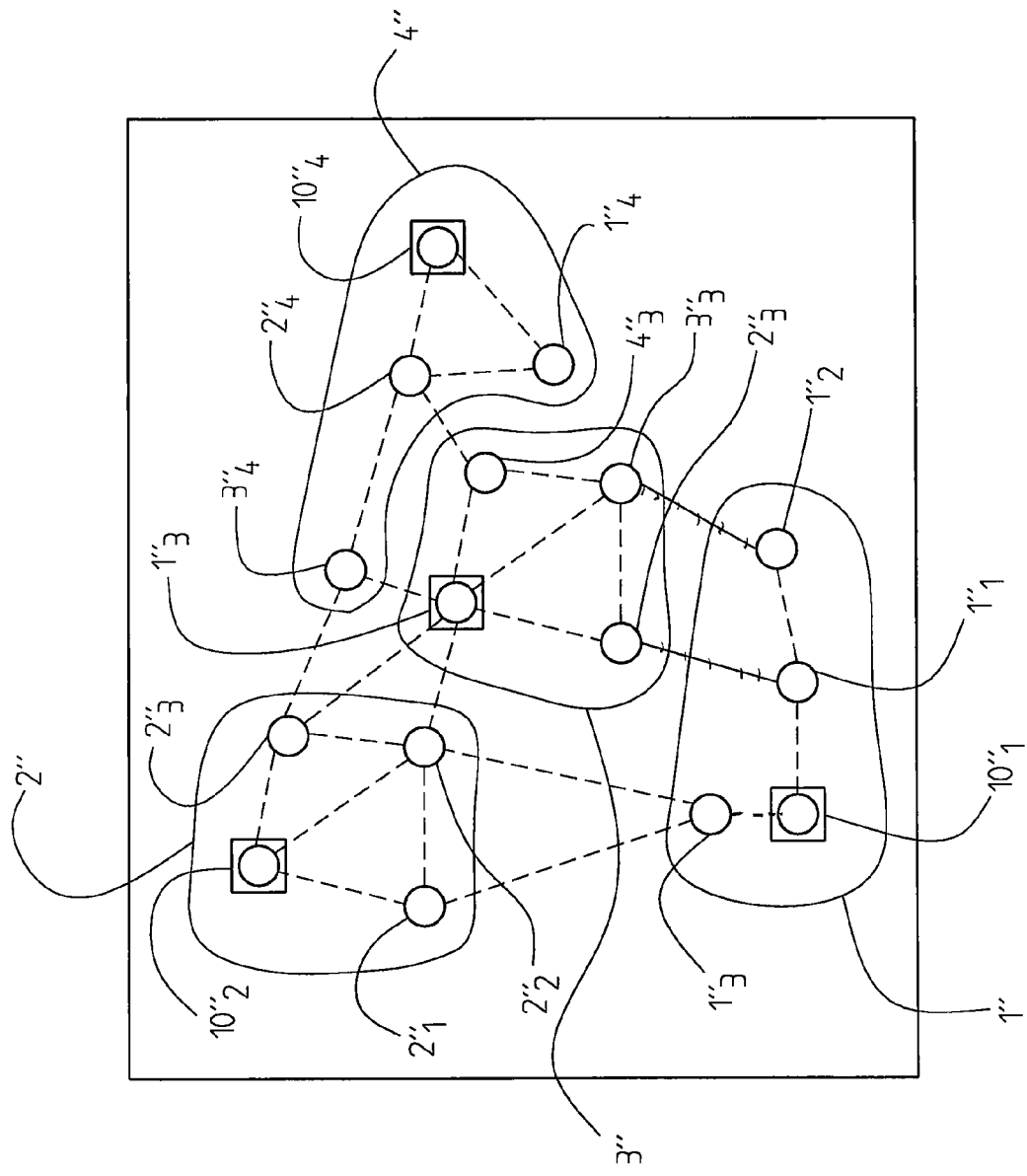
FIG. 3 shows an example of a clustered network backbone according to the inventive concept.

FIG. 3 very schematically illustrates a simple clustered network backbone where the nodes are grouped into four groups 1", 2", 3", 4" wherein group 1", 2" and 4" each comprise a gateway which has been selected as cluster head and wherein for group 3" (having no gateway) a relay node has been selected as a cluster head based on the criteria discussed above. Group 1" also contains relay nodes $1_1"$, $1_2"$, $1_3"$, group 2" comprises relay nodes $2_1"$, $2_2"$, $2_3"$ etc.

Figure 4:
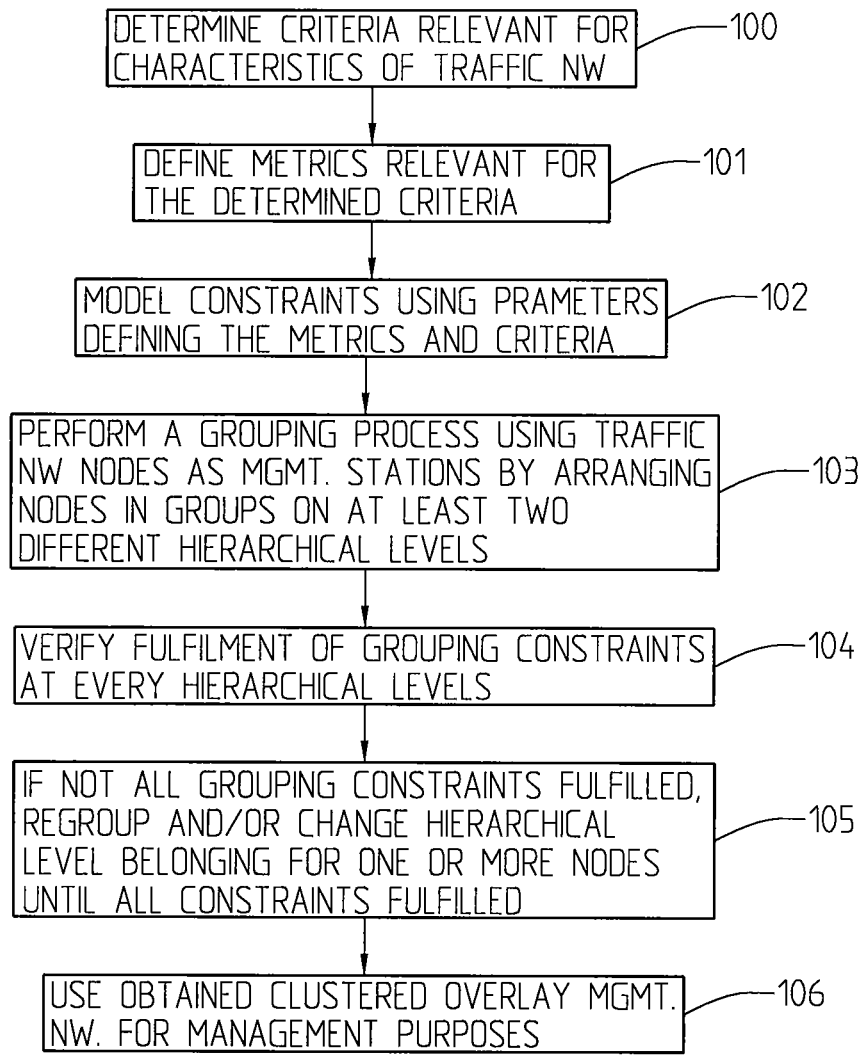
FIG. 4 is a flow diagram describing the procedural steps according to the present invention of the grouping process.

FIG. 4 very schematically illustrates a general implementation of the procedure for managing a traffic network as described above with the basic steps for carrying out the inventive method. For managing a traffic network according to the present invention a hierarchical overlay management network is formed which presupposes that the criteria that are relevant for the characteristics of the traffic network are determined, 100, to set up constraints to be met by the grouping process. This means that the management network according to the present invention is more or less dedicated for the specific traffic network type and thus uses and takes the characteristics of the traffic network into account. In order to be able to determine the criteria, the relevant metrics for the criteria have to be defined, 101. As referred to above the relevant metrics can be used separately or in combination. Two criteria that may be of interest are "nearest and connectivity" for which relevant metrics can be physical distance and temporal distance. The constraints rely on the presence of the above mentioned criteria and are modelled mathematically using parameters defining the metrics and criteria, 102.

Once the constraints are modelled, the grouping procedure can be performed, wherein according to the invention the traffic network nodes are used as management stations, by arranging the nodes in groups in at least two different hierarchical levels, 103. The invention is not limited to any specific number of hierarchical levels. There may be two levels, three levels, four levels etc. More generally, according to the present invention an n-level hierarchical structure can be used with a central manager at the top, for each of a number of groups at the lowest level selected cluster heads or intermediate managers, then superior intermediate managers above them etc. until the top manager. The concept should thus be easily extended to a case with a multi-level hierarchy.

In each hierarchical level, fulfilment of the grouping constraints is verified, 104. If all grouping constraints are not fulfilled, at least a partial regrouping and/or change of hierarchical level belonging for one or more nodes is required. This is done until it can be verified that all constraints are fulfilled, 105. The obtained cluster overlay management network can then be used in different manners for management purposes, 106.

According to the invention the grouping process can be implemented in three fundamentally different ways. In one embodiment a static grouping process is implemented. The groups are built and the cluster heads are elected statically by the network administrator through the central manager (duly considering the constraints referred to above). Then the central manager sends an election message to each node that has been designed as a cluster head (or intermediate, superior cluster head, depending on level and implementation). In response, the contacted cluster head sends or returns an acknowledgement message. If one or more acknowledgement messages is/are missing, i.e. not received after a predetermined time period, this means that one or more nodes are disconnected or that there is a connectivity problem in the network. In that case an alarm is issued. If all the expected acknowledgments are received, however, the central manager notifies each node or cluster member that it is under the responsibility of a particular cluster head and provides each node or cluster member with the identity of the respective cluster head. If the central manager does not receive an acknowledgement from each cluster member that has been notified, an alarm is preferably generated.

In another embodiment a central algorithm is implemented for the grouping process. The central manager then collects all necessary data from the network and runs an algorithm which incorporates the constraints referred to earlier in the application, in order to build the hierarchical or multi-level management network. The central manager sends an election message to each cluster head that constitutes the hierarchy. Then the cluster heads having received the election messages returns responses in acknowledgement messages. If one or more acknowledgment message is missing, an alarm is preferably generated or issued. Otherwise the central manager means notifies the cluster members or nodes that they are under responsibility of a cluster head and provides them with the identity of the respective cluster heads. Similarly, if the central manager does not receive an acknowledgement from each cluster member that has been notified, an alarm is generated.

According to still another embodiment a distributed algorithm is implemented so that all the nodes in the network run the same algorithm. The groups are then built in a distributed fashion. In a particular embodiment existing algorithms used in Ad Hoc networks can be modified through the addition of the constraints referred to above. Alternatively new distributed dedicated algorithms are designed incorporating the constraints (criteria and metrics) as discussed above.

Figure 5:
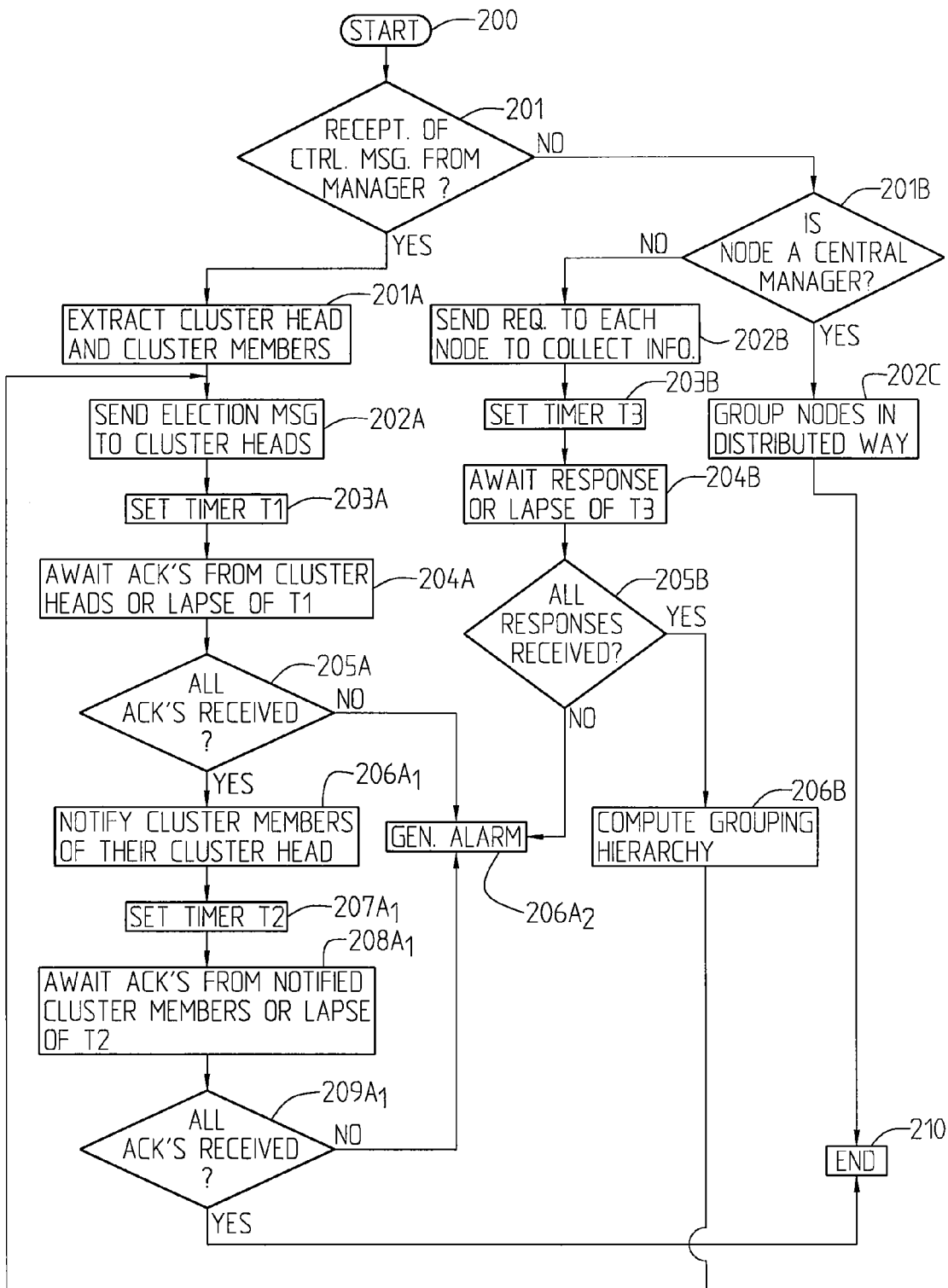
FIG. 5 is a flow diagram which in a more detailed manner shows an example on a grouping procedure.

FIG. 5 shows an example of a grouping procedure followed by a node or a device. In the flow diagram of FIG. 5 an example of a grouping procedure is shown. Here the process is started, 200, and it is (continuously, at regular time intervals or detected upon occurrence) established if a control message is received from a manager in a node, 201. If yes, the cluster head and cluster or group members are extracted from the message, 201A. An election message is sent to the cluster heads, 202A, and a timer, here called T1, is set, 203A. Then it is waited until acknowledgements from the contacted cluster heads are received, or alternatively the timer T1 lapses, 204A. It is examined if all acknowledgements have been received, 205A. If not, an alarm is generated, 206A$_2$. If it however is established that all acknowledgements are successfully received, the respective cluster or group members are notified about their cluster head, 206A$_1$. A timer, here denoted T2, is then set, 207A$_1$. It should be clear that it could be the same timer as the timer T1 or different timers can be implemented. Irrespective of whether one or two timers are implemented, the set time interval can be the same or different for T1 and T2 respectively. One then waits until the acknowledgements from the notified cluster members or group members are received or until the timer T2 lapses, 208A$_1$. Then it is established if all acknowledgments have been received, 209A$_1$. If not, an alarm is generated, 206A$_2$, if yes, this part of the grouping procedure ends, 210, and it is to be repeated when another control message is received etc.

If, in step 201 above, it was established that there is no control message reception from the manager, it is established if the node (device) is a central manager, 201B, i.e. if the manager is a central manager. If not, the nodes are grouped in a distributed way, 202C, and the procedure ends, 210. If on the other hand it is a central manager, a request is sent to each node to collect information, 202B, and a timer, here called T3, is set, 203B. Again a specific timer/time interval may be used which is different from those of T1 and/or T2 or the same. The answers, i.e. the requested information is awaited or, the timer T3 lapses, 204B. It is then examined if all responses are received, 205B. If not, an alarm is generated, 206A$_2$. If yes, the grouping hierarchy is computed (duly considering grouping constraints as discussed above), 206B. Then an election message is sent to the selected cluster head, 201A etc.

Figure 6:
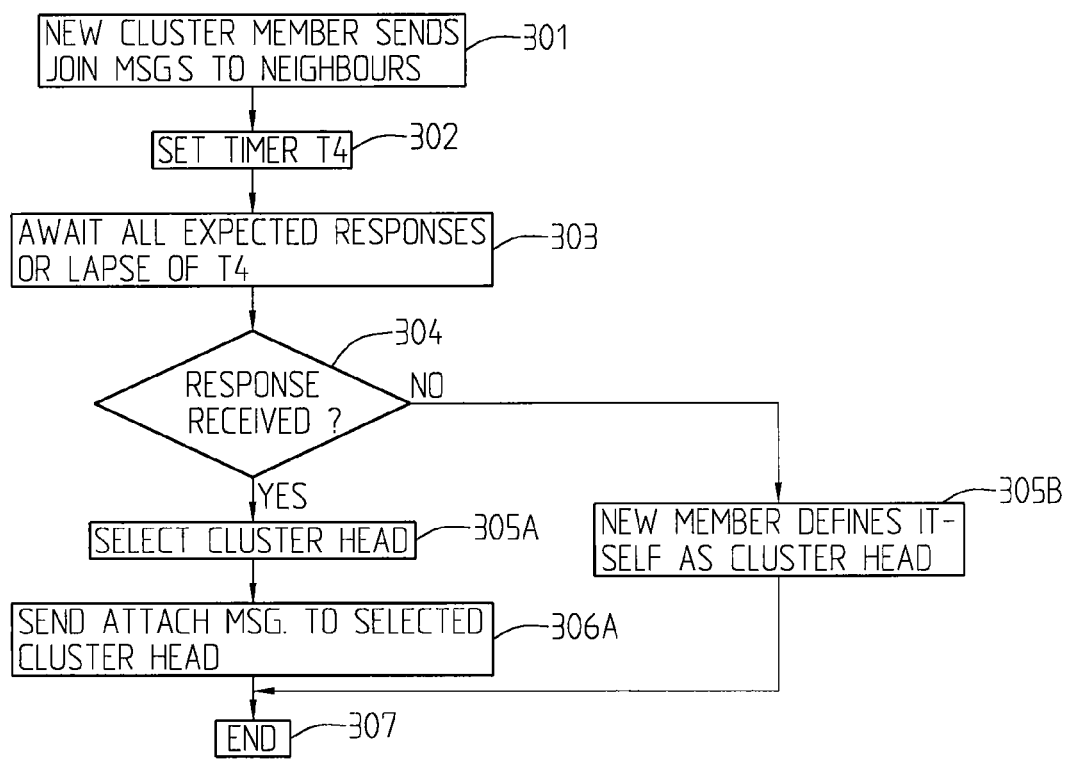
FIG. 6 shows the procedure when a new node or cluster member is added to a group, from the perspective of the new member.

FIG. 6 schematically illustrates a procedure when a node or a new group (cluster) member is added, seen from the new group member. It is supposed that the cluster member sends a join message to the neighbours, 301, i.e. when a node is added, it contacts the neighbours in order to detect the nearest cluster head. At the same time a timer, here called T4, is set, 302. T4 defines the time period a new node devotes to await reception of responses from the neighbours or lapse of T4, 303. If, when T4 has lapsed, the node has not received any responses from the neighbours, 304 No, it defines itself as a cluster head, 305B, and the procedure ends, 307. If however a response is received, 304 Yes based on the information provided by neighbours and on its grouping metrics and grouping constraints, the new node selects a cluster head, 305A. Finally the new node sends an attach message to the selected cluster head, 306A, to notify the cluster head that the node is under its control, and the procedure comes to an end as seen from the new node, 307.

Figure 7:
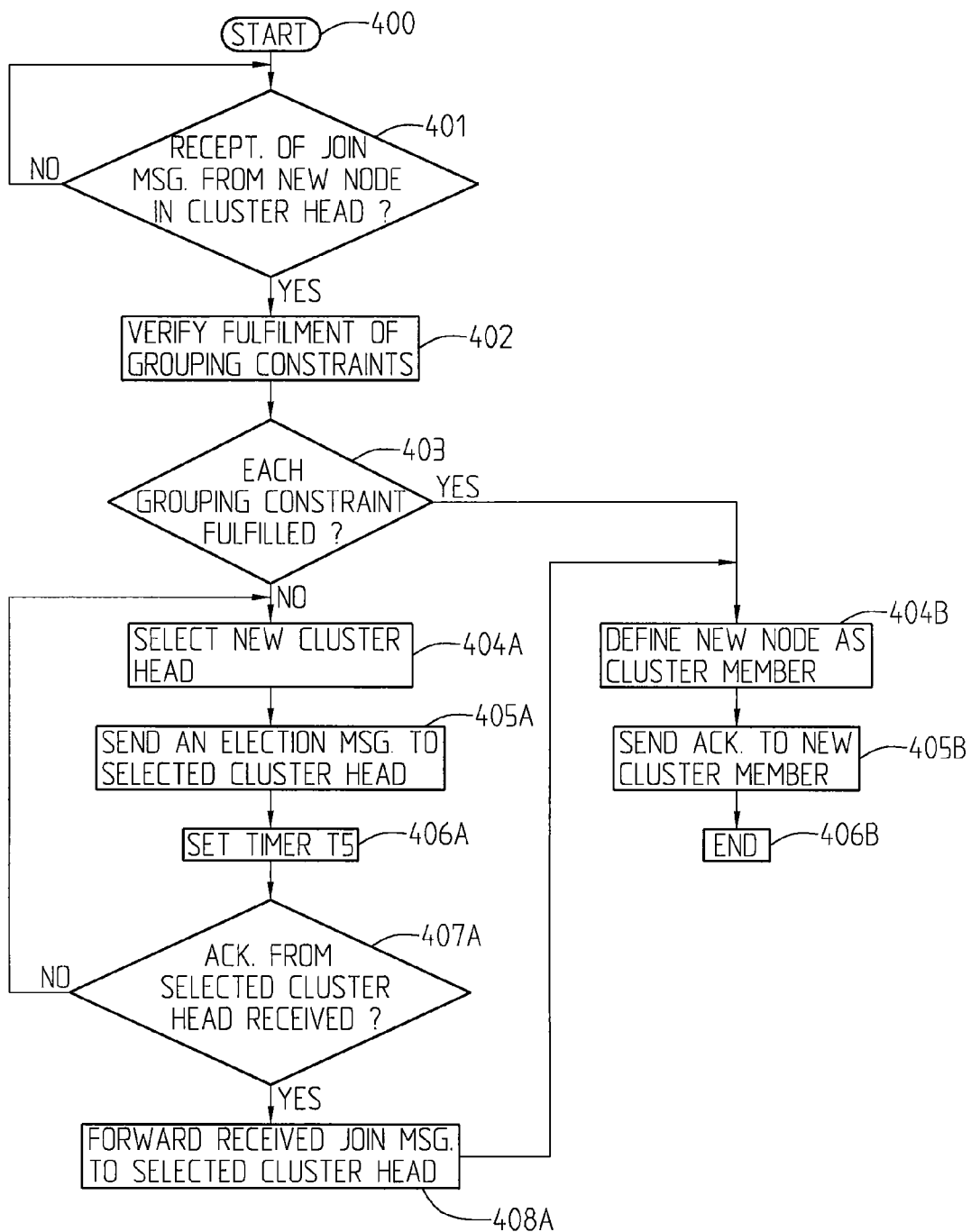
FIG. 7 shows an example of a procedure when a new group or cluster member is added, from the cluster head point of view.

FIG. 7 describes the procedure at arrival of a new group or cluster member seen from the cluster head. It is supposed that the procedure has started, 400, and it established if a join message from a new node is received in the cluster head, 401. If not, the procedure continues with waiting and detection of such a message. When reception of a join message from a new node is detected in a cluster head, the cluster head verifies if the grouping constraints will still be fulfilled if the new group member is accepted, 402. It is thereby established if each grouping constraint is fulfilled, 403. If not, the cluster head selects a new cluster head based on the grouping constraints and metrics, 404A, and forwards the join request, i.e. an election message, to the new cluster head, 405A. A timer T5 is set, 406A, and if the cluster head does not receive an answer from the newly selected cluster head before lapse of T5, i.e. an acknowledgement is awaited, 407A, a new cluster head is selected, 404A etc. This selection procedure is re-iterated until the cluster head receives an acknowledgement. The ultimate candidate for the cluster head selection is the node that is willing to join the group itself. If however an acknowledgement is received, the join message is forwarded to the selected cluster head, 408A, and the new node is defined as a cluster member, 404B, which also is the case if the each grouping constraint was fulfilled under step 403 above. Subsequently an acknowledgement is sent to the new cluster member, 405B, and this part of the procedure ends, 406B.

The join process may alternatively be done statically by the network administrator.

When a node is removed (not shown), the cluster head in charge of the node or group member is informed. If the removed node is a cluster head, then another cluster head is elected within the group. If the network is reorganized, and if the topology changes considerably, then a re-grouping process of the entire network is preferably triggered.

A clustered overlay management architecture or managed system according to the present invention can be used for configuration and fault management. When a central manager decides to configure the set of nodes in the network by sending updates or requests, the central manager first contacts the relevant intermediate managers. Then each cluster head, i.e. intermediate manager, diffuses the requests to the targeted nodes under its authority, i.e. the cluster members. Some configuration decisions can also be triggered by the intermediate manager itself. This means that a part of the decision making is delegated to cluster heads or intermediate managers. With such an implementation it is intended to reduce the number of duplicated and useless messages and thereby to minimize the message overhead and bandwidth usage in the wireless backbone. Also, in one embodiment the intermediate manager or relevant cluster head is informed immediately if a fault appears in the network, if for example a node or a link goes down. The cluster head or intermediate manager (particularly, in a multi-layer hierarchy the level above the level or layer in which there was a failure), analyses, combines and correlates the faults before deciding to forward them to the central (overlying layer) manager or not. As a result, the system can in an efficient way handle topology updates such as node insertion or node removal, fault detection and recovery network reorganization, regrouping etc.

In another embodiment the management concept according to the present invention can be used for viewing topologies and gathering data. Then, an intermediate manager first collects all the relevant data concerning the nodes under its authority. This intermediate manager, acting as a cluster head, then treats and aggregates the data before creating an aggregated topology report. This data collection and aggregation is repeated at every level of the n-level hierarchy. Finally the top-level aggregated report is sent to the central manager, which is the top node in the n-level hierarchy. Such a process significantly decreases the bandwidth usage compared to a centralized approach. The mechanisms are very helpful for the central manager, and service provider, in the context of performance management and accounting. A clustered overlay management architecture will enhance the overall system operation by minimizing the bandwidth consumption and it also improves scalability.

In still another use case, the management system according to the present invention is used to build a distributed directory service. The intermediate manager or cluster head then maintains an index of all the resources under its responsibility. If a node looks for a specific resource or information, it first checks its local index (or cache if a caching mechanism is implemented as well), then it sends a request to the cluster head and finally the central manager is contacted if there was no result. Such a method is more efficient than a centralized approach (which involves a high pressure on the central manager and a risk for a bottleneck) or a flooding approach (which involves a high message overhead to reach the maximum number of nodes). Such a directory service acts as a useful mechanism to provide resource localization, service discovery, peer-to-peer computing etc. It should be clear that other services can be achieved and enhanced on top of the network management system according to the present invention. The invention is also applicable for other services such as security services, quality of service management, policy based management etc.

It is an advantage of the invention that the bandwidth usage within the wireless backbone of the traffic network and further that management traffic is minimized for the traffic network. This is an important advantage since wireless bandwidth is a critical and expensive resource.

The management load is more efficiently and evenly distributed across all network nodes, which removes the need to have a high-capacity central manager. As referred to above the problems of production of bottlenecks and single points of failure in the network are also reduced since the management strategy will be distributed giving a management system which is reliable and robust.

It should be clear that the invention is not limited to the specifically illustrated embodiments but that it can be varied in a number of ways within the scope of the appended claims. Although the invention mainly has been discussed with reference to a three-level hierarchy, it should be clear that the invention is not limited thereto and the reason therefore being that the basic features of the invention easily can be explained with reference to a 3-level hierarchy. It should also be clear that while referring to a central manager, actually the top-node in the hierarchy is meant rather than a central manager in the conventional sense. The grouping means, grouping control means, the modelling and verification means, the calculating means may be implemented in different manners. They may be implemented as separate, specific means or as integrated means, one, more or all of them, in a central manner or in a distributed manner as discussed above.

The invention claimed is:

1. A network management system for management of a traffic network comprising a wired network backbone and a wireless network backbone comprising a plurality of relay nodes comprising wireless routers, some of which acting as gateways to the wired backbone network and some of which acting as relay bridge routers supporting access of a number of access networks, said management system comprising a number of management stations arranged in a distributed manner and adapted to handle sub-networks of said traffic network, wherein the management system comprises a logical multilevel hierarchical overlay network, with a top or central manager, based on the infrastructure of the traffic network and adapted to use the relay nodes as management stations, the management system comprises a grouping processor that performs a grouping process by arranging network nodes, comprising the relay nodes, in groups or clusters, each with a cluster head, on different hierarchical levels, and further comprising a grouping controller that controls the grouping and allocation of cluster heads based on a number of grouping constraints given by one or more criteria to be fulfilled at each hierarchical level, a criteria calculator that calculates the criteria based on given metrics, and a modelling and verification processor that models the constraints and verifies fulfilment of said constraints at each hierarchical level.

2. The system according to claim 1, wherein the grouping processor is provided in the top or central manager.

3. The system according to claim 1, wherein the grouping controller is external and statically groups the nodes and statically selects cluster heads.

4. The system according to claim 3, wherein the external grouping controller comprises an administrating processor or a network administrator.

5. The system according to claim 1, wherein the grouping processor comprises a computing processor running an algorithm incorporating said constraints and wherein the central manager collects data from the network needed to perform the grouping procedure.

6. The system according to claim 1, wherein the grouping processor is distributed and comprises a distributed grouping algorithm containing said constraints and wherein each network node is adapted to contain said distributed algorithm.

7. The system according to claim 1, wherein a first grouping constraint is adapted to control the distribution of the gateways in the groups considering the numbers of gateways and the numbers of groups such that a substantially even distribution is obtained.

8. The system according to claim 7, wherein the modelling and verification processor models at least one or more of said first to fifth constraints based on one or more of a number of parameters relating to numbers of clusters in the network, nodes constituting a particular group i, set of gateway nodes of group i, set of all gateways in the network, connectivity of set i, cluster head of group i, set of nodes constituting default path from a node n to a node nm, connectivity degree of node n, distance between a node n and a default gateway thereof.

9. The system according to claim 1, wherein a second grouping constraint is adapted to control the grouping such that within each group, each group member can be reached by the respective cluster head through a local path.

10. The system according to claim 9, wherein a third grouping constraint is adapted to control the allocation of cluster heads such that in each group containing one gateway node, said gateway node is to be selected as cluster head.

11. The system according to claim 1, wherein a fourth constraint is adapted to control the allocation of a cluster head in a group containing more than one gateway nodes such that the gateway node with the highest connectivity degree is selected as cluster head.

12. The system according to claim 1, wherein a fifth constraint is adapted to control the allocation of a cluster head in a group with no gateway node such that the node closest to a default gateway is selected.

13. The system according to claim 1, wherein at least one of a first and second criterion is used for the constraint modelling, said at least one of the first and second criterion being defined by the metric physical distance and the metric temporal distance respectively, the metric physical distance comprising the hop count between two nodes and the metric temporal distance comprising the transmission time in expected round trip time between two nodes.

14. The system according to claim 13, wherein the first criterion is the nearest physical distance or the nearest temporal distance between two nodes and the second criterion is the connectivity of a node being the number of nodes a given number of hops away from said node or the number of nodes a given time away from a node expressed in round trip time.

15. The system according to claim 1, wherein the grouping processor is adapted to optimize the number of groups in relation to network size, and the number of nodes in the groups with respect to at least one of network size and number of groups with regard to bandwidth consumption and message transmission overhead for managing purposes.

16. The system according to claim 1, wherein each node comprises a message generator, a message receiver and a timer, wherein said message generator generates messages and sends messages to node neighbours when a node is added to the network, or generates and sends messages for at least one of establishment and selection of a cluster head, or generates messages and sends messages to node neighbours when a node is added to the network and generates and sends messages for at least one of establishment and selection of a cluster head, said message generator activating the setting of a timer, the message receiver being adapted to await response messages before lapse of the timer for grouping and establishing cluster heads.

17. A method for managing a traffic network comprising a wired network backbone and a wireless network backbone comprising a plurality of relay nodes comprising wireless routers, some of which acting as gateways to the wired backbone network and some of which comprising relay bridge routers for access of access networks, said method comprising the step of:

arranging a number of management stations in a distributed manner to handle sub-networks of said traffic network, wherein the arranging step comprises:
arranging the management system as a logical, hierarchical network overlying said traffic network;
using the infrastructure of the traffic network defining the relay nodes as management stations, by defining a number of metrics representative of the traffic network characteristics to set up criteria;
performing, at different levels, a grouping process by arranging network nodes in groups or clusters;
for each group, on each level, selecting an overlying cluster head, and in the top layer providing a central manager, said grouping process comprising:
modelling a number of constraints based on said criteria;
verifying fulfilment of said constraints at each hierarchical level.

18. The method according to claim 17, wherein the method comprises the step of:
building the groups statically in the central manager acting as top manager;
selecting statically the cluster heads in the central manager.

19. The method according to claim 18, wherein the method comprises the step of:
controlling the building of groups, selection of cluster heads in the central manager by a network manager.

20. The method according to claim 18, wherein the method comprises the steps of:
sending election messages to selected cluster heads from the central manager;
setting a time limit in the control message, or a timer, within which, or before lapse of which a response is to be received from selected cluster heads, and if no response is received within the time limit, or lapse of the timer; and
selecting one or more new cluster heads;
notifying the group or cluster members about selected cluster head identity upon reception of a response message from a selected cluster head.

21. The method according to claim 17, wherein the method comprises the step of:
using an algorithm, containing the constraints, in the central manager to build groups, select cluster heads, maintain groups comprising handling, at least one of adding and removal of nodes.

22. The method according to claim 17, wherein the method comprises the steps of:
distributing an algorithm handling the grouping process to all nodes,
building groups, selecting cluster heads and maintaining groups comprising at least one of adding and removing nodes in a distributed manner using said distributed algorithms.

23. The method according to claim 17, wherein the method comprises the step of:
building the overlay management network on top of an underlying Infrastructure Wireless Mesh Networks.

24. The method according to claim 17, wherein the method comprises at least one the steps of:
controlling the distribution of gateways in the groups considering the number of gateways in the network and the number of groups such that a substantially even distribution of gateways is obtained using a first constraint;
controlling the grouping such that within each group, each group member can be reached by the respective cluster head through a local path, using a second constraint,
controlling the grouping such that if a group contains one gateway, said gateway is selected as cluster head; and
controlling the selection of cluster heads such that if a group contains several gateways, the gateway with the highest connectivity is selected.

25. The method according to claim 17, wherein the method comprises the steps of:
defining metrics relating to physical distance and temporal distance;
computing criteria based on said metrics;
applying the criteria in a number of constraints, to be fulfilled;
verifying fulfilment of said constraints in the grouping procedure at each hierarchical level.

* * * * *

UNITED STATES PATENT AND TRADEMARK OFFICE
CERTIFICATE OF CORRECTION

PATENT NO. : 8,582,470 B2
APPLICATION NO. : 12/530635
DATED : November 12, 2013
INVENTOR(S) : Collins et al.

It is certified that error appears in the above-identified patent and that said Letters Patent is hereby corrected as shown below:

On the Title Page, in Item [51], under "Int. Cl.", in Column 1, Line 3, delete "H04L 12/24 (2006.01)".

On the Title Page, in Item [51], under "Int. Cl.", in Column 1, Line 4, delete "H04W 84/02 (2009.01)".

On Title Page 2, in Item [56], under "OTHER PUBLICATIONS", in Column 2, Line 3, delete "et al:" and insert -- et al., --, therefor.

In the Specification

Column 1, Line 65, delete "vol 17, no 8," and insert -- vol. 17, no. 8, --, therefor.

Column 6, Line 59, delete "Or" and insert -- or --, therefor.

Column 7, Line 66,
delete " $(\forall i \in \{1 \ldots c\})(\forall n \in C_i)(\forall m \in P_{n,hi})m \in C_i$ " and
insert -- $(\forall i \in \{1...c\})(\forall n \in C_i)(\forall m \in P_{n,hi})m \in C_i$ --, therefor.

Column 8, Lines 4-5,
delete " $(\forall i \in \{1 \ldots c\})\overline{G_i} = 0 \Rightarrow (\forall n \in C_i)(Dist(h_i) \le Dist(n)) \wedge ((Dist(n) = Dist(h_i)) \Rightarrow (Con(n) \le Con(h_i)))$ " and
insert -- $(\forall i \in \{1...c\})\overline{G_i} \ne 0 \Rightarrow (h_i \in C_i) \wedge ((\forall g \in G_i) Con(g) \le Con(h_i))$ --, therefor.

Signed and Sealed this
Fifth Day of August, 2014

Michelle K. Lee
*Deputy Director of the United States Patent and Trademark Office*